(12) United States Patent
Pourchet et al.

(10) Patent No.: US 7,140,168 B2
(45) Date of Patent: Nov. 28, 2006

(54) DEVICE FOR PACKAGING CONTINUOUS WEBS OF MATERIALS SUCH AS SELVEDGES GENERATED ON THERMOFORMING UNITS

(75) Inventors: Jean-Yves Pourchet, Jouhe (FR); Bernard Pourchet, Billey (FR)

(73) Assignee: SARL ADDITIF, Societe a Responsabilite Limitee, Fourcherans (FR)

( * ) Notice: Subject to any disclaimer, the term of this patent is extended or adjusted under 35 U.S.C. 154(b) by 79 days.

(21) Appl. No.: 10/521,293

(22) PCT Filed: Jul. 22, 2003

(86) PCT No.: PCT/FR03/02310

§ 371 (c)(1),
(2), (4) Date: Jan. 14, 2005

(87) PCT Pub. No.: WO2004/011353

PCT Pub. Date: Feb. 5, 2004

(65) Prior Publication Data

US 2005/0241272 A1    Nov. 3, 2005

(30) Foreign Application Priority Data

Jul. 23, 2002   (FR) ................................... 02 09320

(51) Int. Cl.
*B65D 63/00* (2006.01)
(52) U.S. Cl. .............................. 53/520; 53/244; 53/249; 83/402; 241/100; 241/283
(58) Field of Classification Search .................. 53/559, 53/561, 520, 370.4, 373.4, 329.5; 83/167, 83/402, 914; 241/100, 283
See application file for complete search history.

(56) References Cited

U.S. PATENT DOCUMENTS

| | | | | |
|---|---|---|---|---|
| 2,251,312 A | * | 8/1941 | Yoder | 83/317 |
| 3,164,879 A | * | 1/1965 | Sprungli | 26/10.4 |
| 3,400,624 A | * | 9/1968 | Holm | 83/368 |
| 3,593,492 A | * | 7/1971 | Frankefort | 53/559 |
| 3,628,303 A | * | 12/1971 | Graham | 53/453 |
| 4,074,506 A | * | 2/1978 | Sander | 53/493 |
| 4,219,988 A | * | 9/1980 | Shanklin et al. | 53/550 |
| 4,455,809 A | * | 6/1984 | Dallaserra | 53/435 |
| 4,549,582 A | * | 10/1985 | Kung et al. | 139/430 |
| 4,858,416 A | * | 8/1989 | Monaghan | 53/439 |
| 4,889,290 A | * | 12/1989 | Koffsky et al. | 241/36 |
| 5,322,232 A | * | 6/1994 | Freeman et al. | 242/471 |
| 5,459,980 A | * | 10/1995 | Kenney et al. | 53/450 |
| 5,603,801 A | * | 2/1997 | DeFriese et al. | 156/515 |
| 6,276,621 B1 | * | 8/2001 | Henry | 241/60 |

FOREIGN PATENT DOCUMENTS

| | | | | |
|---|---|---|---|---|
| DE | 3434177 | A1 | * | 3/1986 |
| EP | 624440 | A1 | * | 11/1994 |
| GB | 980951 | A | * | 1/1965 |
| JP | 63222038 | A | * | 9/1988 |

* cited by examiner

*Primary Examiner*—Stephen F. Gerrity
(74) *Attorney, Agent, or Firm*—Egbert Law Offices

(57) ABSTRACT

The device for packaging continuous webs of material, such as selvedges generated on thermoforming units, includes an input regulator of webs, driving guide for the webs, a cutting unit and, downstream thereof, a collector for bits of webs. The cutting unit has at least a blade actuated imparted with a reciprocating movement co-operating with a cutting block, and the driving guide is associated with a conveyor by air stream for the webs, preceding immediately the blade and the cutting block.

8 Claims, 2 Drawing Sheets

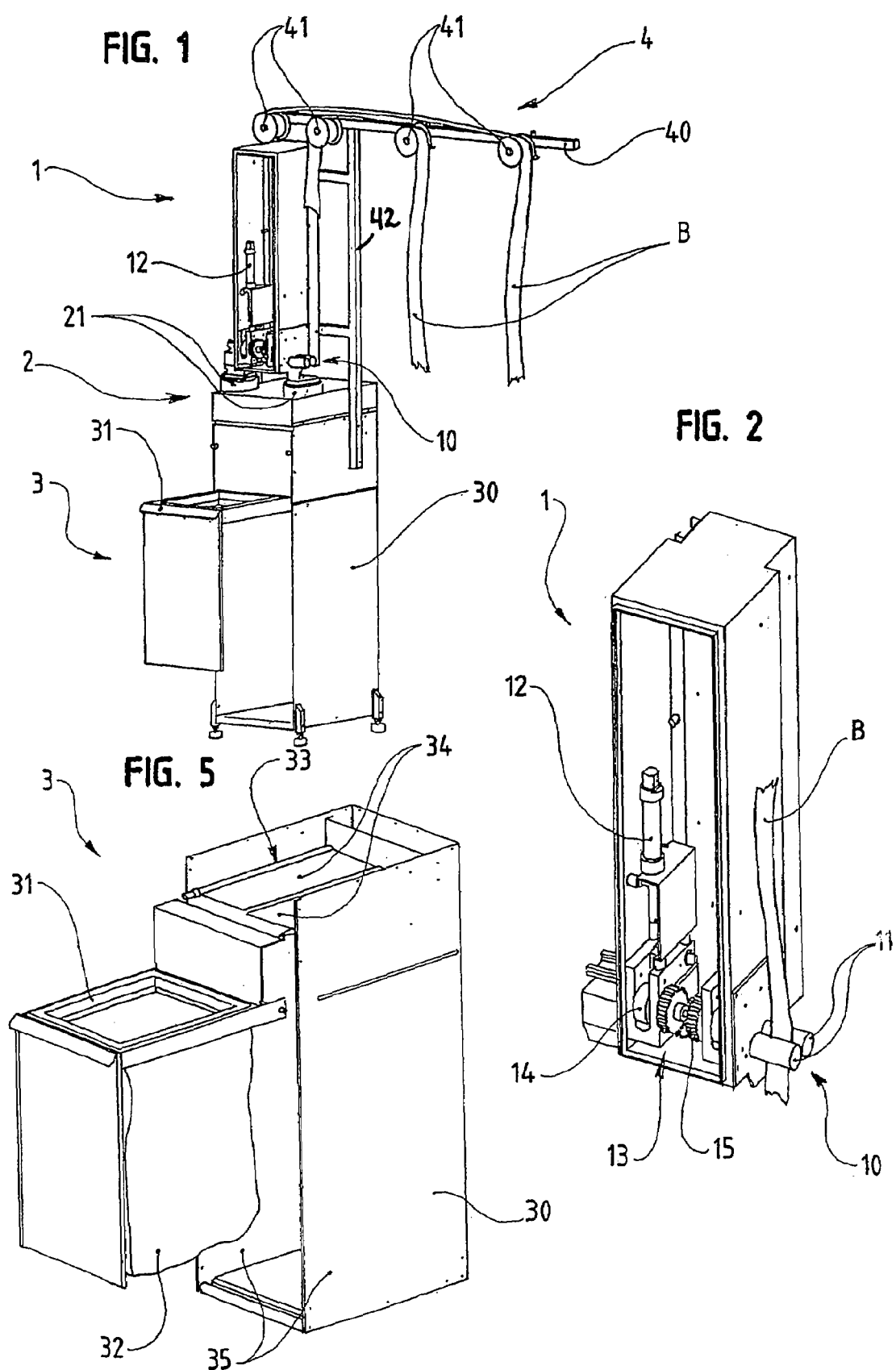

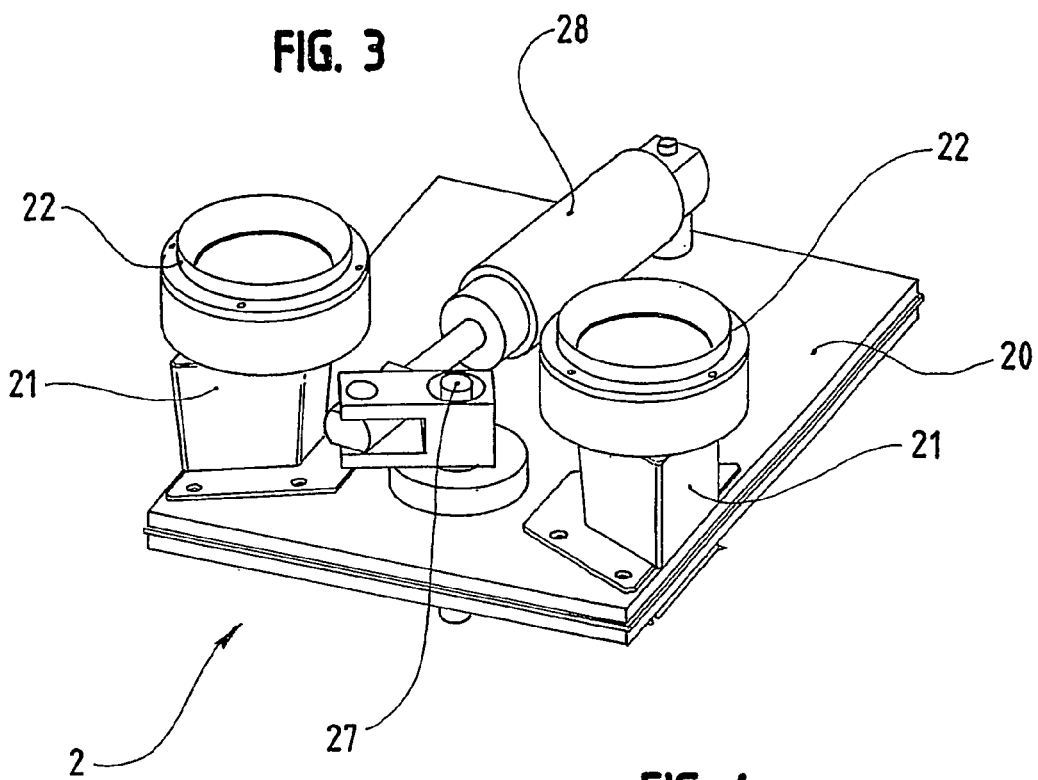
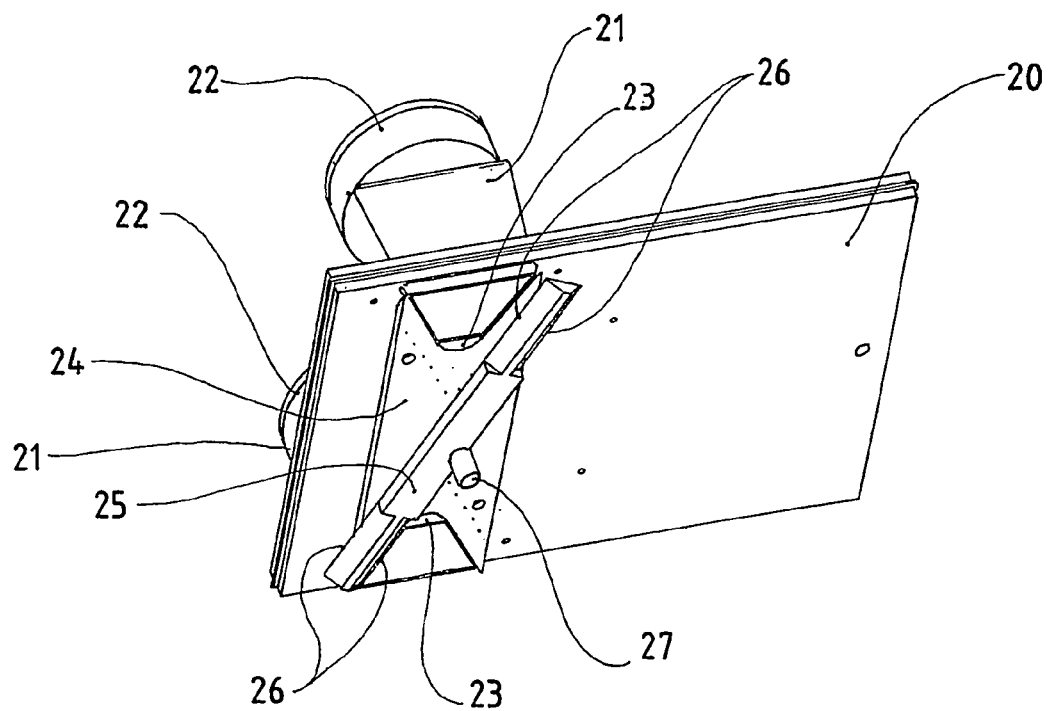

DEVICE FOR PACKAGING CONTINUOUS WEBS OF MATERIALS SUCH AS SELVEDGES GENERATED ON THERMOFORMING UNITS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The object of the present invention is a device for packaging continuous webs of materials such as the selvedges generated on thermoforming units during processes for manufacturing containers for packaging food.

These thermoforming units use plastic material films which move continuously and which they transform thermally, in order to create containers. Once filled and closed, the containers obtained are cut out of these films, in order to separate the packaged products therefrom; this results into waste material which is in the form of webs which are to be removed gradually, in order to clear the machines and to allow the continuation of the manufacturing.

BACKGROUND OF THE INVENTION

There are already known several methods to continuously carry out the removal and the packaging of these webs, namely the one disclosed in U.S. Pat. No. 2,251,312, which consists in cutting the webs into calibrated pieces that can be recovered in containers.

From EP 0 624 440 in applicant's name is also known a machine operating according to a similar method, and which advantageously includes conveying means capable of causing the webs to progress according to the rate of progressing of the thermoforming units, so as to achieve pieces means bring, with a jerked movement, said web to cutting means of the guillotine type, said conveying means as well as the cutting means being driven by one single jack.

Though this machine allows achieving smaller pieces of webs, so as to reduce the volume they occupy in the containers, it has however drawbacks, namely in that it is aimed at being fixed to a thermoforming machine, which, because of its relatively large size, can sometimes prove impossible.

This machine has, in addition, the drawback of being sometimes prone to jamming phenomena during the web-cutting operation, which requires repeated interventions by the operators. These phenomena are frequent when the material film used is made of flexible plastic, which is related to the ways of conveying and cutting used.

BRIEF SUMMARY OF THE INVENTION

The present invention is aimed at providing a device for packaging continuous webs adaptable to any thermoforming unit, allowing to cope with the various abovementioned drawbacks, while being capable of effectively creating pieces of webs occupying a small volume and which can be packaged in an optimal way.

The device for packaging continuous webs of material such as the selvedges generated on inlet of the webs, means for guiding and driving said webs, as well as cutting means and, downstream of the latter, means for collecting the pieces of webs, and it is primarily characterized in that said cutting means consist of at least one blade actuated according to a reciprocating movement co-operating with a cutting block, and in that said guiding and driving means are associated to means for conveying said webs by an air flow, arranged immediately before said blade and said cutting block.

According to an additional feature of the device according to the invention, the guiding and driving means comprise two rollers which roll in opposite direction of rotation to each other, driven stepwise, so as to be capable of gripping the web and of driving it at a determined speed towards the conveying means.

According to another additional feature of the device according to the invention, the rollers are driven by a pneumatic jack in association with a free wheel and a train of gears.

According to another additional feature of the device according to the invention, the means for conveying by an air flow consist of a part having a generally tubular shape including an inlet end through which the web proceeding from the guiding and driving means is inserted, and an outlet end through which said web leaves and at least part of the edge of which forms the cutting block, while internal means are capable of allowing, in association with a pressurized air source, to create an air flow in the input/output direction.

In an advantageous way, the part having a generally tubular shape is conical and is narrowing from the inlet to the outlet.

According to another additional feature of the device according to the invention, the blade is actuated through a pneumatic jack which also constitutes the pressurized air source which generates the air flow.

In a preferred way, the device according to the invention includes an automatic device capable of synchronizing the action of the driving jack with that of the cutting jack.

From the point of view of the design, the blade moves in a horizontal plane, while the conveying of the web is carried out vertically. In addition, a device according to the invention preferably includes two parallel conveying means, one for each of the two selvedges, associated to one single cutting means.

In an advantageous way, the device according to the invention is associated to means for changing the direction including a set of pulleys allowing to convey the webs proceeding from the thermoforming unit, irrespective of the location of said device with respect to the latter.

According to a preferred embodiment of the device according to the invention, the means for collecting the pieces of web include a bag removably mounted on a drawer, which is associated to a mechanism capable of causing, when opening said drawer, a shutter to unfold under the cutting means, in order to collect said pieces during the period necessary for substituting said bag.

In an advantageous way from the safety point of view, the shutter also allows to prevent access to the blade.

The advantages and features of the device according to the invention will become more obvious from the following description which refers to the attached drawing, which represents a non-restrictive embodiment of it.

BRIEF DESCRIPTION OF THE SEVERAL VIEWS OF THE DRAWINGS

FIG. 1 shows a perspective view of the device according to the invention.

FIG. 2 shows a another perspective view of a portion of the same device.

FIG. 3 shows a perspective view of another portion of the same device.

FIG. 4 shows a another perspective view from below the same portion of FIG. 3.

FIG. 5 shows an exploded perspective view of another portion of the same device.

DETAILED DESCRIPTION OF THE INVENTION

When referring to FIG. 1, one can see that the device according to the invention is in the form of a machine aimed at being positioned close to a thermoforming unit, not shown.

This device includes guiding and driving means 1, partially shown, for each of the webs B proceeding from the thermoforming unit, cutting means 2, not visible, and means 3 for collecting the pieces of webs.

The webs B are conveyed from the thermoforming unit through means for changing the direction 4 including a ramp 40 provided with pulleys 41. The ramp 40 is carried by a structure 42 which is reversibly made integral with the device, so that the ramp 40 can extend in various directions, while the pulleys 41 can be moved on the ramp 40, thus authorizing an adapting to installations having different configurations, and independently from the thermoforming unit.

The guiding and driving means 1 are each associated to control means, not shown, of a known type, such as for example the one disclosed in EP 0,624,440, allowing to control the supply of a pair 10 of rollers 11, also visible in FIG. 2, which shows the guiding and driving means 1.

It should be noted that the guiding and driving means 1 comprise two pairs 10 of rollers 11, one for each web B, but that only one can be seen in the figures.

The rollers 10 are driven stepwise in opposite direction of rotation and so as to grip a web B, by means of a pneumatic jack 12 driving a system 13 which includes a free wheel 14 and a train of gears 15.

The webs B are thus conveyed from the top to the bottom, in order to end at the level of the cutting means 2 shown in FIGS. 3 and 4.

When referring to these figures, one can see that the cutting means 2 include a plate 20 through which pass two parts 21 with a conical tubular shape the upper opening 22 of which is widened, while the lower opening 23 is narrow. The lower opening 23 of each tubular part is edged by a cutting block 24 aimed at co-operating with a blade 25 including four cutting edges 26 and mounted on a shaft 27 pivotally actuated through a pneumatic jack 28 fixed on top of the plate 20. The reciprocating travel of the pneumatic jack 28 generates an alternating displacement of the blade 25 which sweeps the two lower openings 23.

Furthermore, the two tubular parts 21 internally comprise means, not shown, capable of generating an air flow from the top to the bottom, in association with a pressurized air source, for example proceeding from the pneumatic jack 28.

The two tubular parts 21 are each arranged in front of a pair 10 of rollers 11, so that the latter bring the end of the web B they drive into the tubular part 21.

One will understand that the end of the web B, after its passing between the rollers 11, is guided by the air flow until the lower end 23 of the part 21 where it is cut between the blade 25 and the cutting block 24, whether in one direction of pivoting or in the other one, because of the presence of the four cutting edges 26.

In a particularly advantageous way, the pneumatic jack 12 is controlled by an automatic device, not shown, and synchronized with respect to the cutting jack 28 which controls the blade 25.

The frequency of the jack 27 is preferably constant, the length of the pieces of web B thus depending on the speed of the pneumatic jack 12, which is adjustable.

The conveying of the end of the web B by an air flow, i.e. contactless, and its guiding because of the conicity of the part 21 advantageously allow to avoid the jamming phenomena, in particular when the webs B are made of a flexible material.

When referring now to FIG. 5, one can see that the collecting means 3 aimed at being arranged immediately below the cutting means 2 includes a box 30 provided with a drawer 31 carrying a removable bag 32.

The box 30 is provided internally with a shutter 33 movable through pivoting, in order to adopt two positions, i.e. a horizontal and a vertical one, in order to close or open, respectively, the access to the bag 32. In this case, the shutter 33 is made of two pieces 34 hinging on the side walls 35 of the box 30.

The passing over from one position into the other one is controlled by the actuation of the drawer 31, thus the extraction of the latter causes the shutter 33 to close, and conversely.

The closing of the shutter 33 allows recovering the pieces proceeding from the cutting of the webs during the substitution of the bag 32, without it being necessary to stop the cutting operation nor the thermoforming operation, as well as preventing access to the blade 25.

The shutter 33 is arranged in the box 30 at a determined height, so as to delimit a volume V which is filled during the period required for extracting the drawer 31 and substituting the bag 32. In an advantageous way, means are provided for which allow to determine that the volume V is filled, so as to eventually warn the process in the event the period of opening of the drawer 31 is extended. These means can consist of sensors, but also of means which allow to determine, depending on the known flow rate, the duration of filling of the volume V, which is also known.

We claim:

1. An apparatus for packaging continuous webs of material comprising:
   a means for controlling an input of the webs of material;
   a means for guiding and driving the webs of material positioned downstream of said means for controlling;
   a means for cutting the webs of material into pieces, said means for cutting positioned downstream of said means for guiding and driving; and
   a means for collecting the pieces positioned downstream of said means for cutting, said means for cutting comprising:
      at least one cutting block; and
      a cutting blade in which the blade is actuated in a reciprocating movement cooperating with said cutting block, and said means for guiding and driving having a means for conveying the webs by an air flow arranged immediately before the blade and said cutting block.

2. The apparatus of claim 1, said guiding and driving means comprising a pair of rollers which roll in opposite directions of rotation to each other, said pair of rollers suitable for gripping the web of material and driving the web of material at a predetermined speed toward said means for conveying.

3. The apparatus of claim 2, said pair of rollers being driven by a pneumatic jack associated with a free wheel and a train of gears.

4. The apparatus of claim 1, said means for conveying comprising:
   a part having a generally tubular shape, said part having an inlet end into which the web of material is insertable from said guiding and driving means, said part having an outlet end through which the web of material can pass, at least a portion of an edge of said outlet end being said cutting block.

5. The apparatus of claim 4, said part being conical so as to narrow from said inlet end to said outlet end.

6. The apparatus of claim 1, said means for cutting further comprising:
   a pneumatic jack drivingly connected to the cutting blade.

7. The apparatus of claim 1, further comprising:
   a means for changing a direction of the webs of material positioned upstream of said means for guiding and driving and downstream of said means for controlling, said means for changing a direction comprising a set of pulleys mounted on a ramp.

8. The apparatus of claim 1, said means for collecting the pieces comprising:
   a drawer;
   a bag removably mounted on said drawer, said means for cutting having a shutter thereunder; and
   a means for unfolding of said shutter when opening said drawer.

* * * * *